US005905786A

United States Patent [19]
Hoopes

[11] Patent Number: 5,905,786
[45] Date of Patent: May 18, 1999

[54] CONSOLE AND EXTENSION TELEPHONE SYSTEM

[75] Inventor: Thomas A. Hoopes, Sandy, Utah

[73] Assignee: Oakley Telecom, LC., Salt Lake City, Utah

[21] Appl. No.: 08/822,795

[22] Filed: Mar. 24, 1997

[51] Int. Cl.$^6$ ............................. H04M 1/56; H04M 15/06
[52] U.S. Cl. ......................... 379/142; 379/179; 379/183; 379/373
[58] Field of Search .................................. 379/67, 88, 89, 379/142, 199, 201, 215, 246, 253, 374, 375, 252, 179, 183, 373; 381/40, 41, 42, 43

[56] References Cited

U.S. PATENT DOCUMENTS

| | | | |
|---|---|---|---|
| 4,995,075 | 2/1991 | Angiolillo-Bent et al. | 379/142 |
| 5,220,599 | 6/1993 | Sasano et al. | 379/142 |
| 5,351,289 | 9/1994 | Logsdon et al. | 379/142 |
| 5,420,912 | 5/1995 | Kopp et al. | 381/42 |
| 5,497,414 | 3/1996 | Bartholomew | 379/142 |
| 5,579,386 | 11/1996 | Koda | 379/142 |
| 5,596,631 | 1/1997 | Chen | 379/177 |
| 5,604,791 | 2/1997 | Lee | 379/142 |
| 5,623,537 | 4/1997 | Ensor et al. | 379/67 |
| 5,644,629 | 7/1997 | Chow | 379/142 |
| 5,655,011 | 8/1997 | Brown | 379/142 |

*Primary Examiner*—Curtis A. Kuntz
*Assistant Examiner*—Binh K. Tieu
*Attorney, Agent, or Firm*—Mark G. Pannell; Hanes & Schutz, P.C.

[57] ABSTRACT

A system and method for altering an incoming ring signal to produce a selected ring signal on a telephone device. The incoming ring signal is accompanied by a caller ID packet and provided by a telephone utility provider responsive to a call made by a caller. The communication system includes a system console and at least one addressable extension module. The system controller and each addressable extension module are in communication with the telephone line. The system console includes (i) means for decoding the caller ID packet to determine the identity of the caller, (ii) a storage device for storing saved caller information including caller identities and corresponding ring control information, (iii) means for selecting ring control information from the saved caller information and the identity of the caller, and (iv) means for providing the ring control information to the telephone line. Each addressable extension module additionally communicates with a respective telephone device. Each addressable extension module includes (i) means for receiving the ring control information from the telephone line, (ii) means for detecting the incoming ring signal, (iii) means for determining a duration of the incoming ring signal, and (iv) means for selectively providing communication during the incoming ring signal between the first telephone device and the telephone line in accordance with the ring control information to produce the selected ring signal. Additionally, each addressable extension module includes means for redirecting an audio signal to the telephone line and means for redirecting the audio signal from the telephone line.

24 Claims, 10 Drawing Sheets

CONSOLE AND EXTENSION TELEPHONE SYSTEM

TECHNICAL FIELD

This invention relates in general to communication technology and, more particularly, to a system and method for managing telephone calls and communicating on a local loop telephone line.

BACKGROUND OF THE INVENTION

Recent advances in telephone services have provided telephone customers with a caller identification (ID) feature. This feature allows telephone subscribers to determine the telephone number of a caller if the subscribers have the appropriate caller ID decoding device and subscribe to a caller ID service. Features of these caller ID devices typically include a display, memory for storing the names and telephone numbers of known callers, and memory for storing the telephone numbers of previous callers. The display is used for showing information about the call, including the telephone number of the caller, the caller's name, and the date and time of the call. The telephone company provides the number and/or name of the caller. The date and time may either be provided by the telephone company or the caller ID device.

When a call is made to a person in the U.S. subscribing to a caller ID service, the information concerning the telephone number of the caller is provided on the telephone line via a digital data stream between the first and second ring signals. Other countries may provide the information at different times in the ring cadence. The caller ID device typically decodes the information and displays the telephone number of the caller on a viewing screen of the device. Often the name of the person calling is also displayed if such information is provided by the caller ID service or the device has been programmed to associate the telephone number of the current caller with a particular name. In order for the person being called to determine if the call is one which that person wishes to answer, the video display must be examined. If the video display is in a different location from the person being called, it may be inconvenient or impractical to go to the location where the telephone number and/or name of the caller is displayed.

Prior solutions to this problem have been for the caller ID device to produce an audio signal which identifies the caller or telephone number of the caller. One of these devices is disclosed in U.S. Pat. No. 5,490,205 wherein one of two ringing sounds is broadcast over a loudspeaker to identify specific callers. However, if the person being called is at a telephone extension other than the one connected to the device the broadcast ringing sounds may not be heard. In this case, a single device with an audio signal has little advantage over a caller ID device which merely has a video display. That is, the person being called will still have to go to the location of the caller ID device or to install multiple audio signal devices.

Another prior art method of screening calls is disclosed in U.S. Pat. No. 5,351,289 wherein a device suppresses the first ring of a call and, after receiving the caller ID information, determines whether to allow the call to continue. This prior art device must be programmed to select which calls are allowed to continue and which ones are not. Programming the device in advance prevents the user from deciding at the time of the call whether or not to accept the call.

Additionally, it is desirable to direct calls generated from specific numbers to only a portion of the telephone devices connected to the same line. Prior art systems for directing calls to a desired extension, such as the system disclosed in U.S. Pat. No. 5,220,599, require the caller to input the extension desired. These prior art solutions do not allow the person being called to select which extensions will ring and thus be connected to the incoming call.

Furthermore, it is desirable to enable a person to send audio or data signals from one telephone to another telephone or telephones within the same parallel circuit regardless of whether a telephone call is in progress.

Accordingly, objects of the present invention are to 1) provide a call management system which modifies the ring signal on a standard telephone line to produce unique rings on all selected telephone devices connected to the same line as the call management system, the unique rings and the selection of the telephone devices being in response to a comparison between the telephone number of the current caller and telephone numbers stored in the system and 2) allow intercom and data transmission activities on the telephone line regardless of whether a telephone call is in progress.

SUMMARY OF THE INVENTION

The device and method of this invention permits a user to identify a caller through a specific ring pattern of selected telephone devices on a common parallel circuit. Caller identification information must be supplied to the system by way of the local telephone service provider. Upon receipt of caller identification information, the user may review the incoming message and delete or add it to an electronic telephone book or database that is maintained within the system to be used in receiving and identifying future calls. Alternatively, the user may enter caller identification information to the electronic telephone book through a telephone touchpad. The user may select from several different ring styles, including normal, short, double short or two digital voice prompts. Additionally, the user may select which telephone devices will ring or whether all or none of the telephone devices will ring. Parallel operations allow all telephones that are on the same line (local loop) to be supported by this unique ring feature. The user is alerted by a unique ring that is presented to selected standard telephone devices in a parallel fashion as is found in all homes. This unique parallel approach allows selected standard telephones to ring with a modified or normal cadence, yet does not require re-wiring of individual telephones on the circuit. The unique ring feature allows the user to decide whether to answer the call, ignore it or allow it to be answered by an answering machine with a pre-recorded message.

The user can alternatively instruct the telephone to ring differently if a call is placed by a party that has not been identified. Some callers may have elected to have their call identity masked by having the telephone company issue an anonymous caller identification. The present invention may be programmed to either ring uniquely or automatically pick up the call and issue a digital voice response.

Furthermore, the present invention allows intercom and data transmission activities to be carried out between telephone devices on the same common parallel circuit. These activities are carried out regardless of whether a telephone call is in progress.

Other objects, advantages, and capabilities of the present invention will become more apparent as the description proceeds.

DETAILED DESCRIPTION OF THE INVENTION

Figure 1:
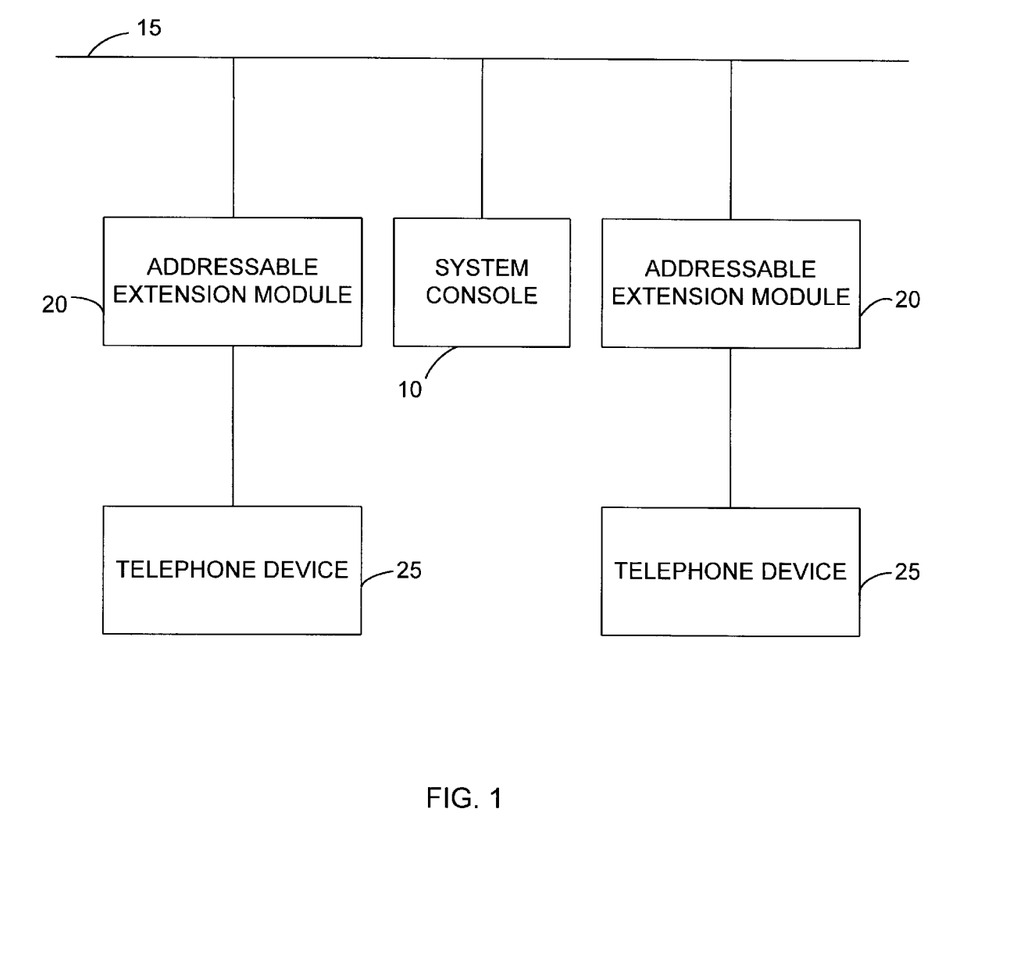
FIG. 1 is a block diagram of the present invention.

FIG. 1 is a sample configuration of the present invention. System console 10 is in communication with telephone line 15. Addressable extension modules 20 are in communication with respective telephone devices 25 and telephone line 15. Telephone devices 25 must communicate with telephone line 15 through respective addressable extension module 20. System console 10 and all addressable extension modules 20 are in communication with the same local loop parallel telephone circuit. Neither system console 10 nor addressable extension module 20 need communicate with telephone line 15 at any particular location, as long as each is connected to the same common parallel telephone circuit as the others. Telephone devices 25 are any devices which communicate over a telephone line 15. Telephone devices 25 include, but are not limited to, telephones, telephone answering machines, cordless telephones, facsimile machines, and computer modems.

A preferred method of communication between telephone line 15, system console 10, addressable extension modules 20, and telephone devices 25 is a direct electrical connection. System console 10 and addressable extension modules 20 preferably have a direct electrical connection to telephone line 15. Additionally, addressable extension modules 20 have a direct electrical connection to respective telephone devices 25. Telephone devices 25 are connected to telephone line 15 only through respective addressable extension modules 20.

System console 10 controls addressable extension modules 20. System console 10 preferably communicates with addressable extension modules 20 by providing control codes on telephone line 15. Preferably the control codes are provided on telephone line 15 in frequency shift keying (FSK) data packet format with mark and space frequencies beyond 100 kHz. These high frequencies are well above human audible range and beyond the 3500 Hz limit that is typically imposed by the telephone utility provider's central office (CO). This digital only channel is reserved for the transmission of control codes. By locating the FSK frequencies above the CO limit, data can be reliably sent to all phones on the line during all phases of phone operation. These phases include on-hook, off-hook, ringing, and audible conversation without interfering with normal operation.

Table 1 illustrates a preferred FSK data packet configuration. The data packet structure includes a synchronization header byte, a device address byte, a device command byte, and packet error detection byte. The synchronization header byte allows packet synchronization. The device address byte indicates which addressable extension modules 20 will carry out the device command. The device command provides instruction to each addressable extension module 20 indicated by the device address byte. The packet error detection byte uses a cyclic redundancy check (CRC) to determine if errors occur during the transmission of the data packet.

TABLE 1

| First Byte | Second Byte | Third Byte | Fourth Byte |
| --- | --- | --- | --- |
| SYNCHRONIZATION HEADER | DEVICE ADDRESS | DEVICE COMMAND | ERROR DETECTION |

All addressable extension modules 20 receive the data packet and decode the information. Each addressable extension module 20 has a distinct module address. Each addressable extension module 20 analyzes the device address byte to determine if its module address is included. Each addressable extension module 20 with a module address included in the device byte address carries out the command indicated by the device command byte. The commands direct addressable extension modules 20 to either connect or disconnect telephone devices 25 to telephone line 15.

Addressable control modules 20 optionally contain one or more channels of line-carrier, bi-directional audio links. These audio links are suitable for the transmission of audio signals throughout a typical home or small office. Audio signals include high quality voice, music, or digital data. A bi-directional audio link may be established between two or more telephone devices 25 while the telephone line 15 is being used by a third party without interfering with the call. This audio link can perform intercom duties, retrieval of telephone messages, or carry digital data in the form of audio channel commands from addressable extension modules 20 to system console 10. Audio channel commands preferably include a command to add an extension to an existing telephone conversation.

Normally, addressable extension module 20 will prevent a third party from listening in on an existing conversation that is underway. However, the person engaged in the conversation on the same circuit as the party wishing to be "added in" may issue an "add command" from his or her telephone and thus allow a third person into the conversation. A preferred means of issuing an audio channel command, such as an "add command," is for the user to issue a predetermined sequence of tones from telephone device 25.

Similar to the digital control channel, the audio channel link preferably transmits voice, music, and data in an FSK format. This channel is also placed well beyond the human audible range and beyond the 3500 Hz limit of the CO switch equipment. When analog information is being encoded on the audio link channel, the audio generates a proportional frequency shift (deviation) of the carrier. If digital data is being sent on the channel link, then discrete mark and space frequencies are used.

Figure 2:
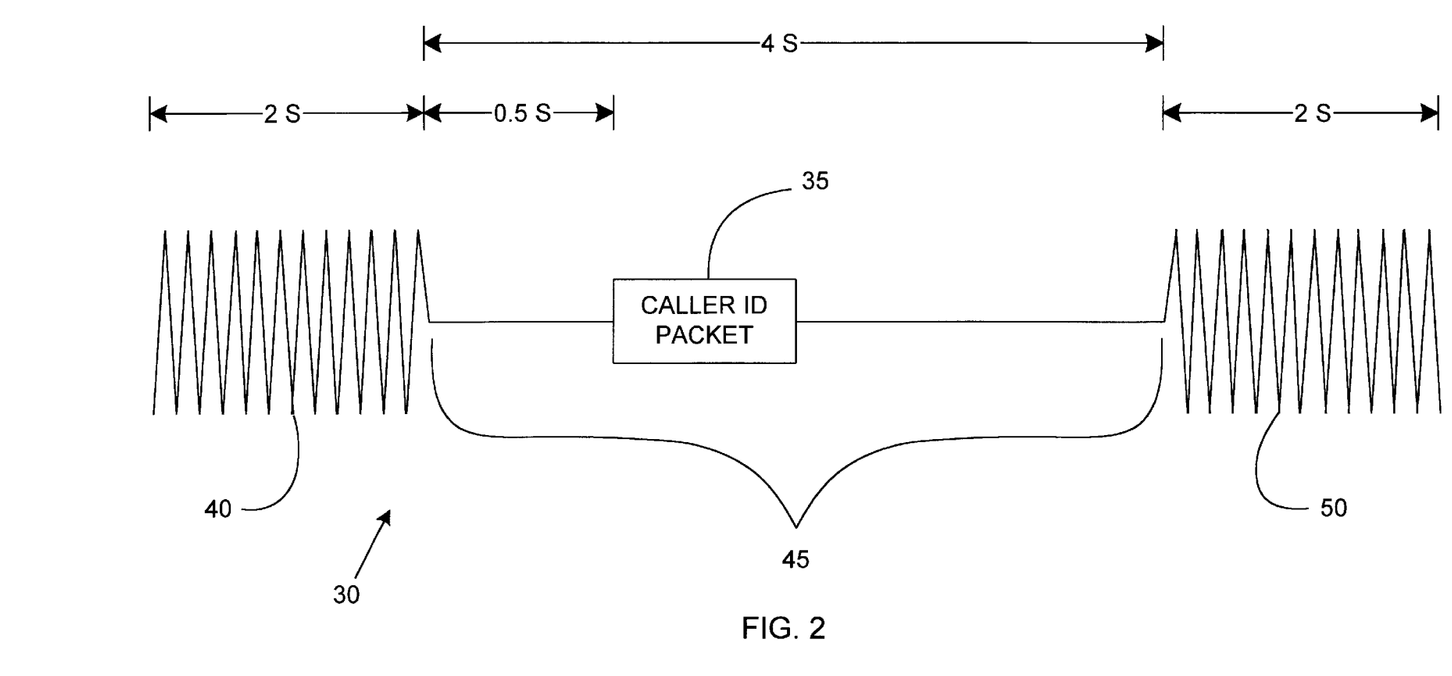
FIG. 2 is a voltage vs. time trace of a typical ring cadence with a caller ID packet.

FIG. 2 shows a typical ring cadence 30 with a caller ID packet 35. Ring cadence 30 is typically a first ring signal 40

(typically two seconds), followed by a gap 45 (typically four seconds), followed by a second ring signal 50 of the same duration as first ring signal 40. This pattern continues until the ringing stops or the call is answered. Caller ID packet 35 is typically transmitted between first 40 and second 50 rings approximately ½ second after the end of first ring signal 40. The transmission time of caller ID packet 35 is variable depending on the message type and length, but an average time is about 600 milliseconds.

Figure 3:
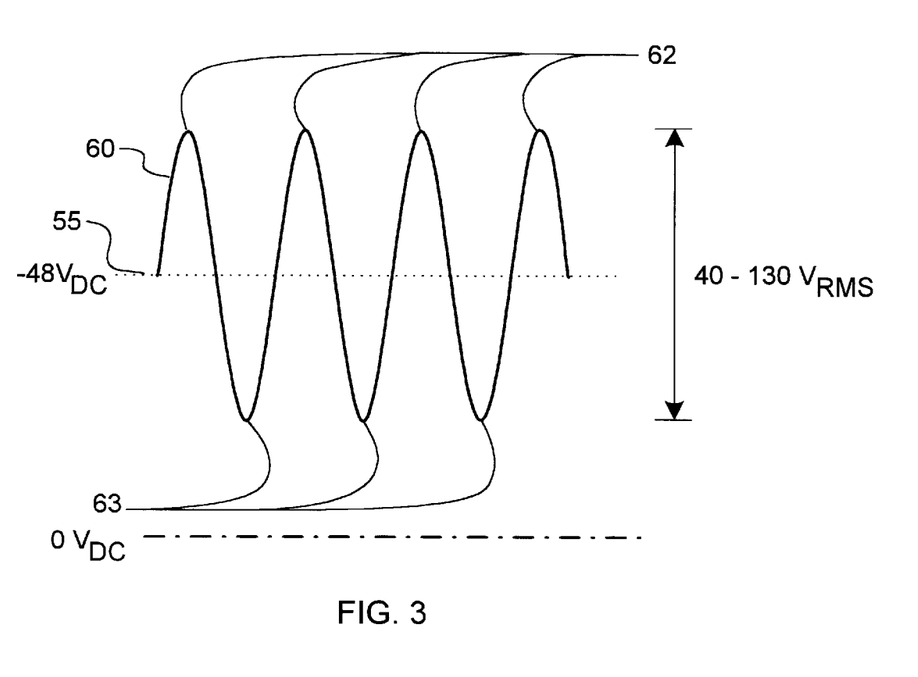
FIG. 3 is a voltage vs. time trace of a portion of a typical ring signal.

FIG. 3 shows a portion of a typical ring. The "on-the-hook" voltage level 55 (or line threshold voltage) for telephones in the United States is typically 48 volts dc but may vary from 47 to 105 volts dc. Voltage 55 is actually negative, but is referred to here in a positive manner for ease of reference. A telephone is made to ring by superimposing a nominal 90 volts RMS, 20 Hz ring signal 60 on telephone line 15. Ring signal 60 includes negative going pulses 62 and positive going pulses 63. The amplitude of ring signal 60 is not standardized and may vary from 40 to 130 volts and 16 to 60 pulses per second (pps). Negative going pulses 62 are counted to obtain the 16 to 60 pps.

Figure 4:
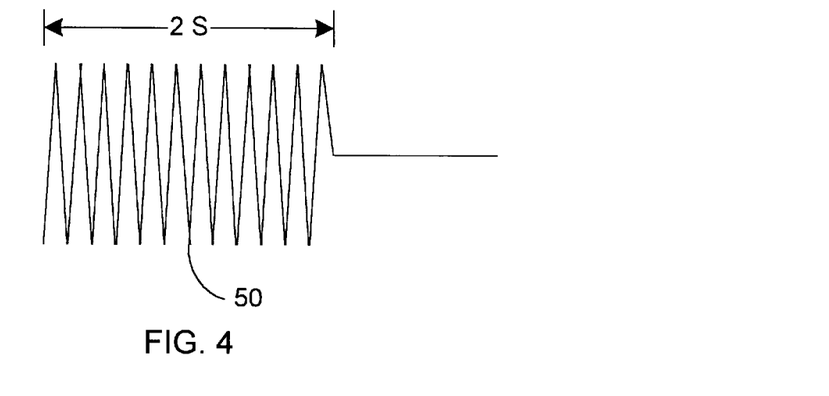
FIG. 4 is a voltage vs. time trace of a normal telephone ring.
Figure 5:
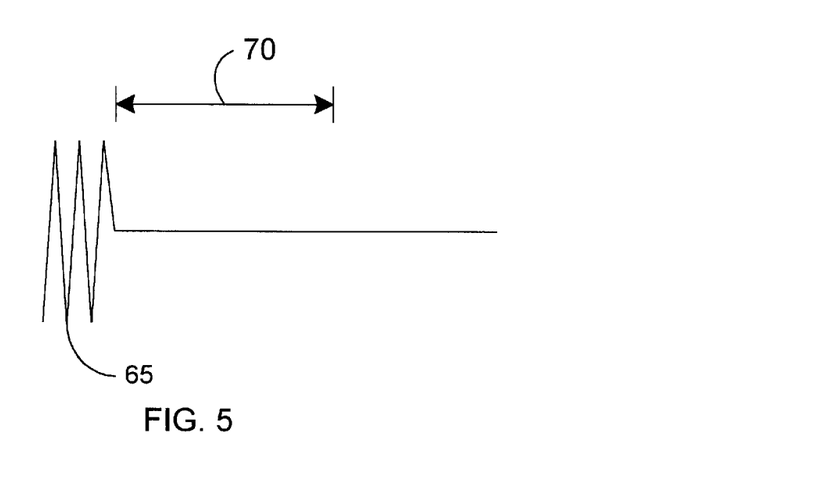
FIG. 5 is a voltage vs. time trace of a short ring of the present invention.
Figure 6:
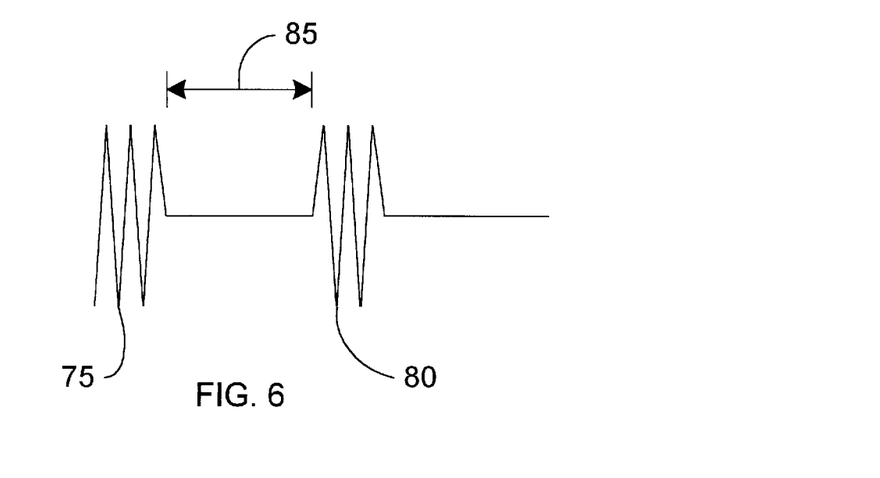
FIG. 6 is a voltage vs. time trace of a double short ring of the present invention.

FIGS. 4–6, in reference to FIG. 2, illustrate three examples of the many possible unique telephone ring options of the present invention. The present invention additionally provides the option of preventing the telephone ring entirely. FIG. 4 is a ring trace of normal (unmodified) ring signal 50 which is typically two seconds in duration. Normal ring signal 50 is followed by normal (usually four-second) gap 45 (FIG. 2), which is followed by another normal ring signal 50. The pattern of ring signal 50 followed by gap 45 continues until the ringing stops or the handset is lifted.

FIG. 5 is a ring trace of a preferred embodiment short ring 65. Short ring 65 is produced by connecting telephone device 25 to telephone line 15 during portion 50 and disconnecting telephone device 25 during portion 70 of normal ring signal 50 (FIG. 4). Ring portion 70 is followed by normal gap 45 (FIG. 2), which is followed by another short ring 65. This pattern continues until the ringing stops or the handset is lifted. Although telephone device 25 may be connected or disconnected at any point of ring signal 60 (FIG. 3), all changes in connection are preferably made while ring signal 60 is crossing voltage level 55. In the preferred embodiment, short ring 65 is produced by connecting telephone device 25 during short ring 65 portion of normal ring signal 50, while disconnecting telephone device 25 during remaining portion 70 of normal ring signal 50. Alternatively, a short ring is produced by connecting telephone device 25 during any portion of normal ring signal 50 while disconnecting telephone device 25 during the remaining portion or portions of normal ring signal 50.

FIG. 6 illustrates another unique ring of a preferred embodiment of the present invention, double short ring 75, 80. In a preferred embodiment, double short ring 75, 80 is produced by connecting telephone device 25 during first short ring 75 of normal ring signal 50, disconnecting telephone device 25 during center portion 85 of normal ring signal 50, then connecting telephone device 25 during a second short ring 80 of normal ring signal 50. Alternatively, a double short ring is produced by connecting telephone device 25 during any two portions of normal ring signal 50 in a manner that each short ring may be distinguished from the other. Second short ring 80 is followed by normal gap 45 which is followed by another double short ring 75, 80. This pattern continues until the ringing stops or the handset is lifted.

The three ring cadences described above are exemplary only and the present invention is not limited to these ring types. Alternative ring cadences include a triple ring and a combination of any of the ring types.

Figure 7:
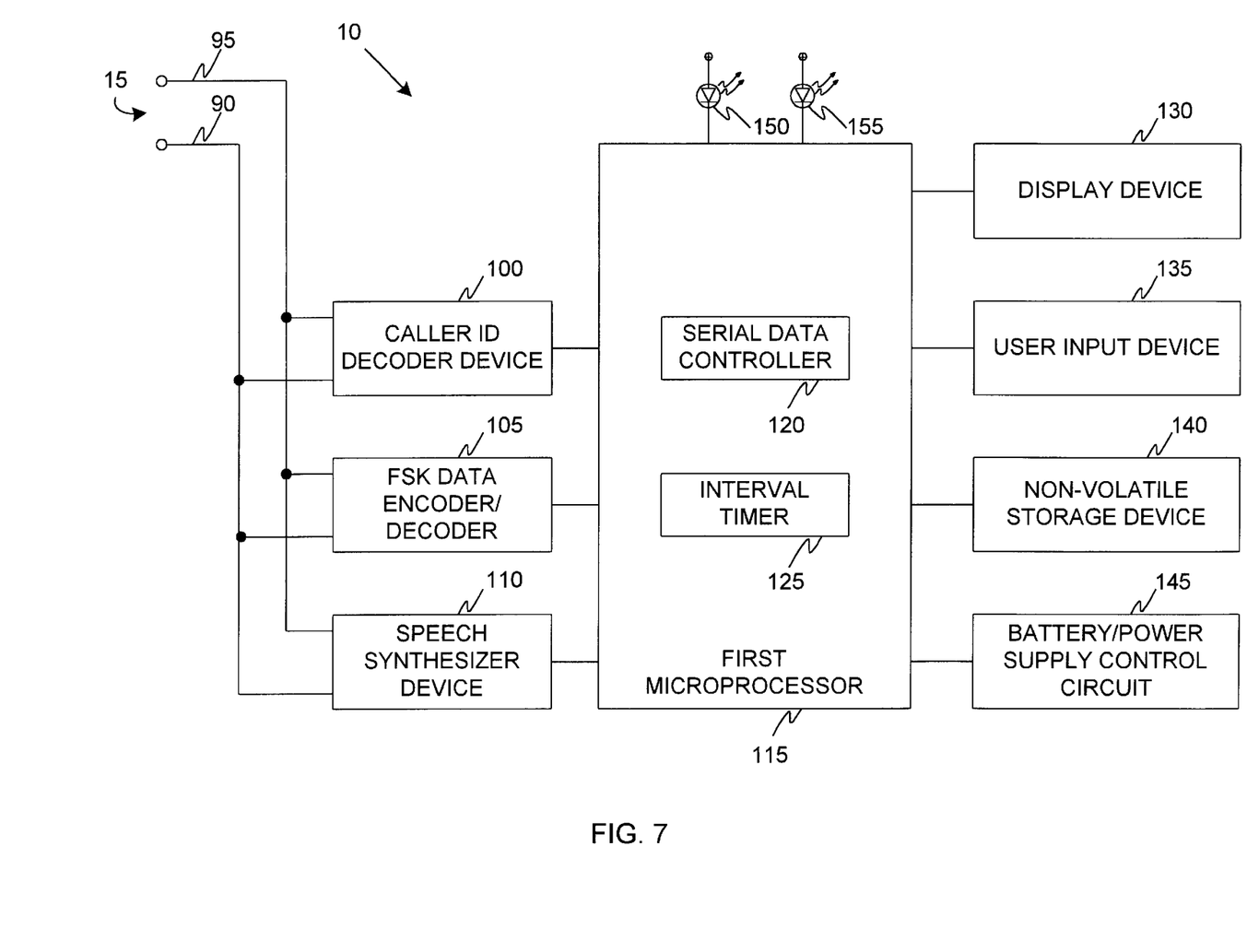
FIG. 7 is a block diagram of a preferred embodiment of the system console of the present invention.

FIG. 7 shows a block diagram of a preferred embodiment of system console 10 of the present invention. Telephone line 15 comprises RING line 90 and TIP line 95. Caller ID decoder device 100, FSK data encoder/decoder 105 and speech synthesizer 110 are each connected between telephone line 15 and first microprocessor 115. Caller ID decoder device 100, FSK data encoder/decoder 105, and speech synthesizer device 110 may be any device known in the art which performs the appropriate function. Speech synthesizer device 110 includes a hold circuit (not pictured). First microprocessor 115 is preferably a highly integrated, eight bit, CMOS microprocessor. First microprocessor 115 comprises, selectively, in hardware, software, or both, first serial data controller 120 and first interval timer 125. Each of these devices 120, 125 is controlled by first microprocessor 115 and may be implemented by any means known in the art. First microprocessor 115 also provides the means for making all calculating and determinations with respect to the present invention.

Additionally, connected to first microprocessor 115 are display device 130, user input device 135, non-volatile storage device 140, battery/power supply control circuit 145, first light emitting diode (LED) 150 for indicating caller ID log status, and second LED 155 for indicating caller ID information has been received from call waiting. The caller ID log is a chronological list of all of the incoming calls. The second LED 155 flashes to indicate a call or calls have been logged to the caller ID log. Each of these devices 130–155 may be implemented by any means known in the art. Non-volatile storage 140 includes a database having an electronic telephone book of user selected callers with an associated ring style byte and device address byte.

Figure 8:
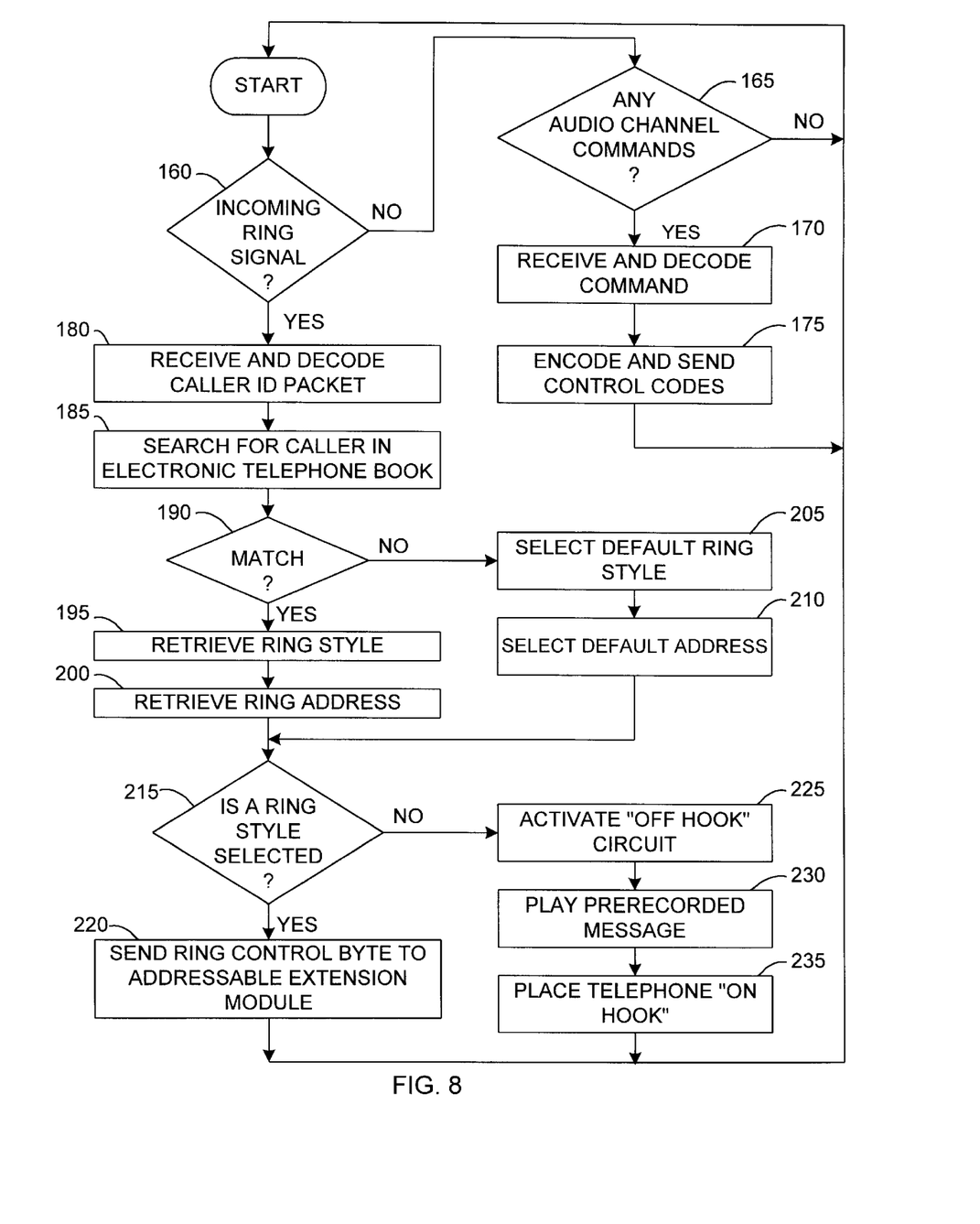
FIG. 8 is a flow diagram for the system console of the present invention.

FIG. 8 shows a flow chart depicting a preferred method for controlling system console 10 of the present invention. System console 10 first checks 160 for an incoming first ring signal 40 (FIG. 2). If no incoming first ring signal 40 is present, system console 10 checks 165 for an audio channel command. An audio channel command is a command issued from a telephone device 25 to activate an audio function of the present invention system. For example, pressing a pre-defined sequence of keys on a telephone issues a command to activate an intercom function between telephone devices 25.

If no audio channel commands are present, system console 10 again checks 160 for an incoming first ring signal 40. This process of first checking 160 for an incoming first ring signal 40, then checking 165 for audio channel commands is repeated until either an incoming first ring signal 40 or an audio channel command is detected. If an audio channel command is detected, the audio channel command is received and decoded 170. Control codes responsive to the audio channel commands are then provided 175 on telephone line 15 for reception by addressable extension modules 20. These control codes instruct specific addressable extension modules 20 to encode and decode audio signals for the audio channel link.

Once system console 10 has finished processing the audio channel command system console 10 again checks 160 for an incoming first ring signal 40. If an incoming first ring signal 40 is detected, the caller ID packet 35 is received and decoded 180. Internal first microprocessor 115 then searches 185 the existing database within the electronic telephone book for a match 190 to the telephone number information received. If a match 190 is found, then the ring style byte and ring address byte are retrieved 195, 200 from the database. If no match is found, a default ring style and ring address are selected 205, 210. The ring style is analyzed 215 to determine if a ring or voice response is indicated. If a ring response is indicated, system console 10 provides 220 the ring control information and the ring address information on telephone line 15 for reception by addressable extension modules 20. The ring control information is included in the device command byte and the ring address information is included in the device address byte.

In operation, system console 10 decodes caller identification information packet 35 and searches the existing database within the electronic phone book for a match to the phone number information received. If a match is found, then the ring style byte and ring address are retrieved from non-volatile storage device 140. System console 10 then sends a data packet to addressable extension modules 20 indicating which addressable extension modules 20 are to ring and with which ring cadence.

Preferably, addressable extension modules 20 do not provide communication between telephone devices 25 and telephone line 15 except as instructed by system console 10. Since system console 10 does not provide instruction until after first ring 40 and caller ID packet 35 have been received, telephone devices 25 will not ring during first ring signal 40.

If a voice message code is found, then system console 10 enables the hold circuit associated with speech synthesizer 110 which allows enough loop current to activate 225 the "ring trip." An ADCPM (adaptive differential pulse code modulation) speech processor chip plays 230 a pre-recorded verbal response to the caller offering instructions to remove the anonymous identification block or a simple message refusing all calls from selected numbers. Upon completion of the voice message, the hold circuit is disabled and telephone device 25 is placed 235 back "on-hook." System console 10 then begins the process again and checks for an incoming first ring signal 40.

When a call is placed to a telephone, the central office places a ring signal 60 on the line of the appropriate frequency, voltage, and cadence. The ring generator at the central office has a current loop detector to determine when the handset is picked up so that the ring may be canceled. This canceling mechanism of the telephone ring is called the "ring trip." When the telephone is "off hook," this loop typically carries about 20 milliamps of current from the central office through the telephone set and back to the central office.

Figure 9:
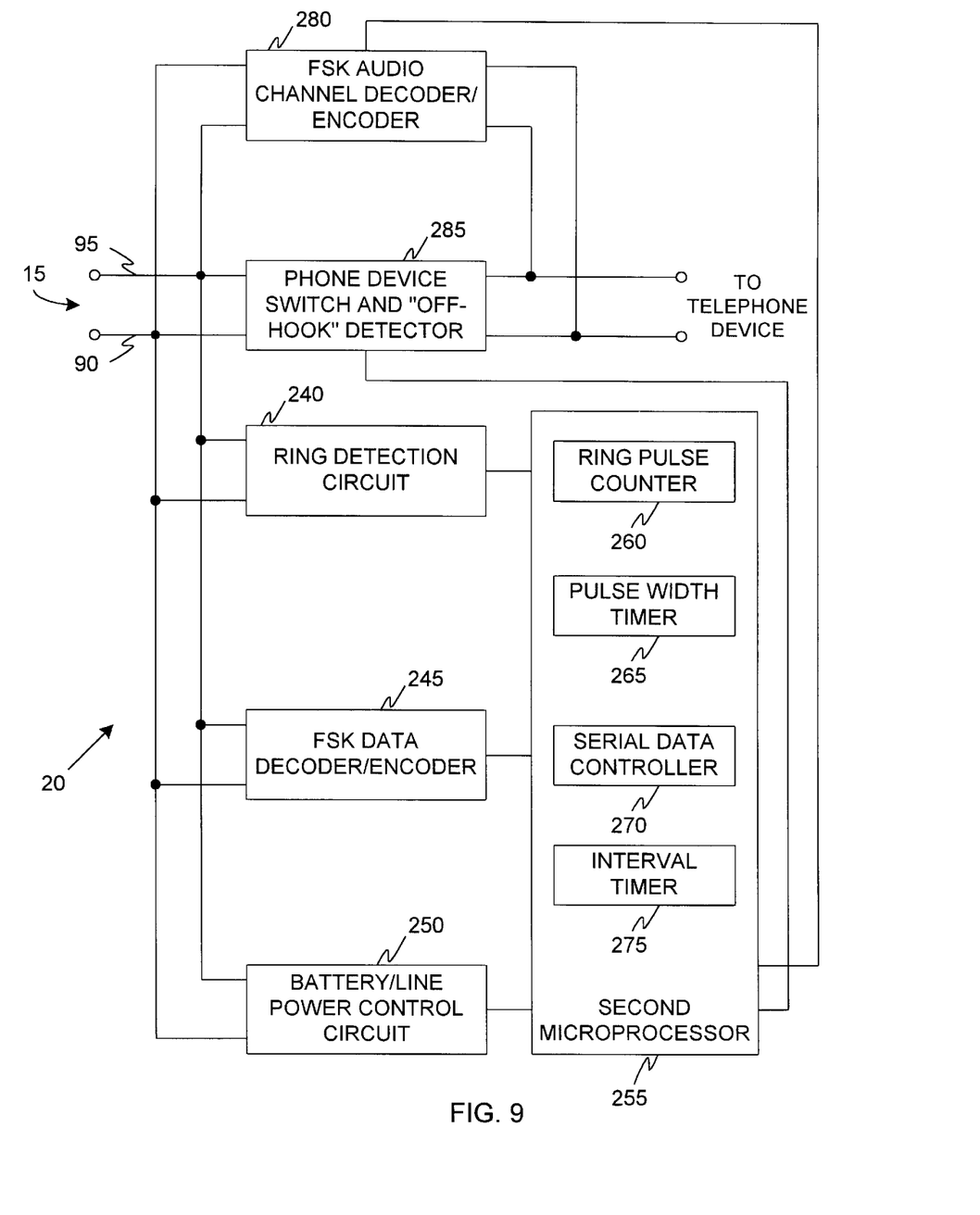
FIG. 9 is a block diagram of a preferred embodiment of an addressable extension module of the present invention.

FIG. 9 shows a block diagram of a preferred embodiment of an addressable extension module 20 of the present invention. Ring detecting circuit 240, FSK data decoder/encoder 245 and battery/line power control circuit 250 are each connected between telephone line 15 and second microprocessor 255. Ring detecting circuit 240, FSK data decoder/encoder 245 and battery/line power control circuit 250 are any devices known in the art which perform the appropriate function. Second microprocessor 255 is preferably a highly integrated, eight bit, CMOS microprocessor. Second microprocessor 255 comprises, selectively, in hardware, software, or both, ring pulse counter 260, pulse width timer 265, second serial data controller 270, and second interval timer 275. Each of these devices 260–275 is controlled by second microprocessor 255 and may be implemented by any means known in the art. Second microprocessor 255 also provides the means for making all calculating and determinations with respect to the present invention.

Additionally, connected to second microprocessor 255 are FSK audio channel decoder/encoder 280 and telephone device switch and "off-hook" detector 285. FSK audio channel decoder/encoder is controlled by second microprocessor 255 and is connected between telephone line 15 and a telephone device 25 (FIG. 1). Each of these devices 280 and 285 are implemented by any means known in the art.

First ring signal 40 (FIG. 2) is used to create a timing profile for modification of second and subsequent rings 20. Since ringing frequencies can and do change according to ring type specifications (Type A—20 Hz±3 and 30 Hz±3 to Type P—15.3 Hz to 34.0 Hz) the system must adapt the timing to correctly modify second and subsequent rings. A new timing profile must be created for each call because the ring frequency may change from one call to the next. Ring type B (15.3 Hz to 68.0 Hz) is the broadest frequency range and has been used as a minimum requirement when pattern matching. The duration and period of each ring pulse 62 is measured and the total number of pulses 62 are counted for first ring signal 40.

The hardware and software that measure the ring timing profile permit dynamic adaptation to central office variations. There are three critical pieces of information that are collected during the first ring cycle to create the ring profile. Second microprocessor 255 contains a pulse width timer 265 that is configured to measure negative going pulse 62 width of first ring signal 40 and then re-configured to measure positive going pulse 63 width. The total number of negative going pulses 62 are totalized in ring pulse counter 260. The accumulated negative going pulse 62 width time is then divided by the number of ring pulses to produce the average negative going pulse 62 width. The accumulated positive going pulse 63 width time is divided by one less than the number of negative going ring pulses 62 to produce the average positive going pulse 63 width.

Addressable extension modules 20 may be powered by an external power supply, battery, or receive its power directly from telephone line 15. If it is powered from telephone line 15, a small amount of energy is extracted from that line and stored in a high efficiency capacitor. This energy is then available during high current periods.

FSK audio channel encoder/decoder 280 consists of a VCO (voltage control oscillator), PLL (phase lock loop), and audio path control circuitry. The VCO is used to convert the audio material into frequency modulation (FM) format, to modulate a high frequency carrier (approximately 100 kHz) which is then coupled to telephone line 15.

The PLL is configured in an FM signal detection format. Encoded audio information is detected on telephone line 15. It is then amplified, limited, and demodulated to its original form.

Since the bandpass of the standard audio is far below the center frequency of the PLL, the signal is ignored by this circuitry. In other words, standard audio on telephone line 15 will not be heard on the audio link channel (unless specific redirection circuitry is enabled) nor will audio link information be heard on standard telephone line 15.

Figure 10:
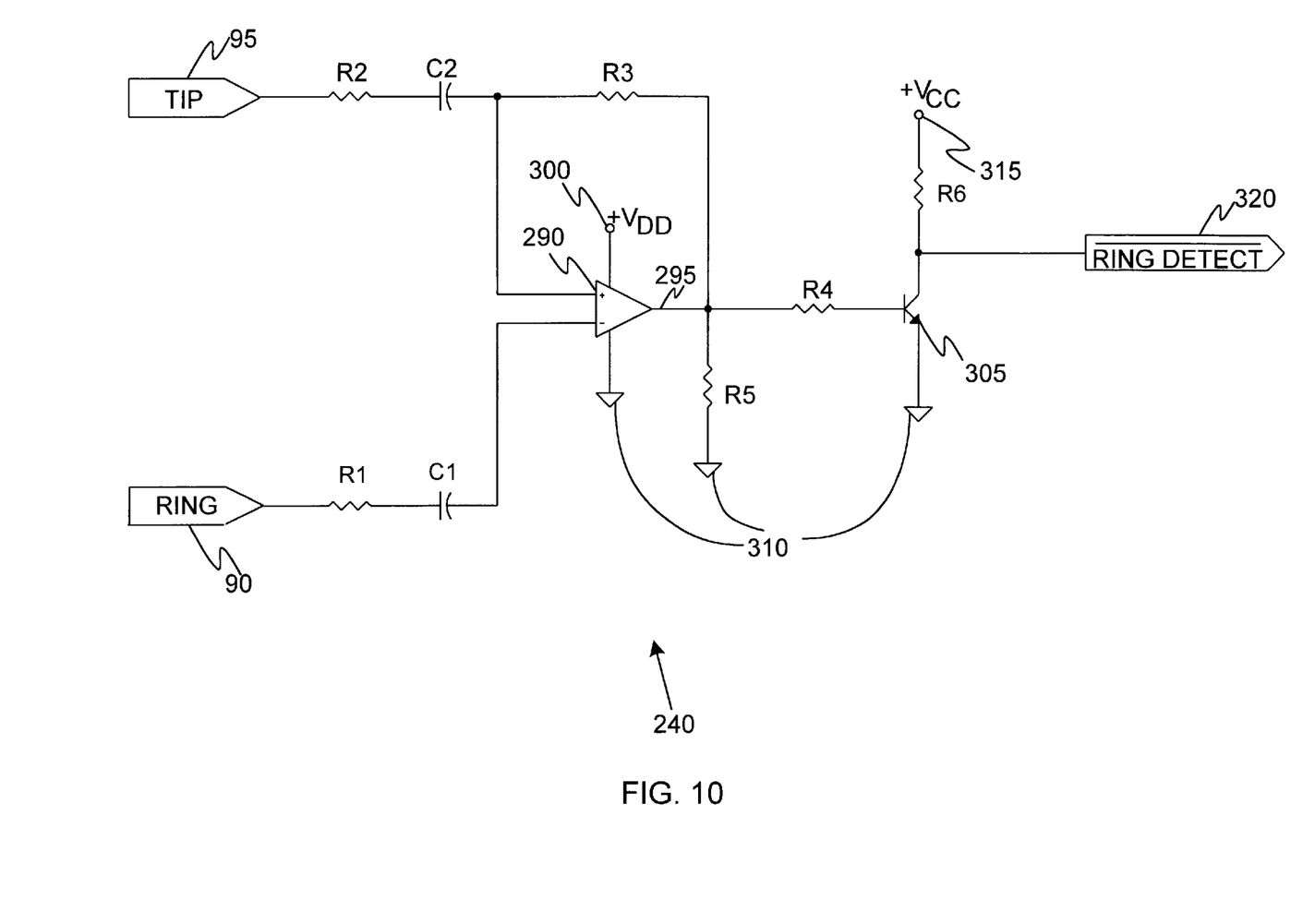
FIG. 10 is a schematic diagram of a ring profiling and detecting circuit for the addressable extension module.

FIG. 10 represents a preferred embodiment of a ring detecting circuit 240 for detecting and profiling a ring signal 60 on telephone line 15. Ring detecting circuit 240 detects ring signal pulses 62, 63. It is necessary to detect ring signal pulses 62, 63 for two reasons 1) in order to create a ring profile, and 2) to detect the beginning of a second ring signal 50. A new ring profile must be created for each call because ring frequencies can and do vary from call to call. Telephone line 15 includes RING line 90 and TIP line 95. The voltage between these two lines 90, 95 is the voltage imposed on the telephone line 15. The ring profile includes the duration and frequency of ring signal 60.

Referring to ring detecting circuit 240, first and second resistors R1, R2 are connected to RING line 90 and TIP line 95 respectively. Resistors R1, R2 reduce the amplitude of ring signal 60 (FIG. 3). The reduced alternating current (AC) signal is capacitively coupled to operational amplifier 290 through first capacitor C1 and second capacitor C2. Operational amplifier 290 amplifies negative going ring pulses 62 (FIG. 3) creating output 295 with corresponding positive pulses having amplitudes which are slightly less than $V_{DD}$ 300. A small amount of hysteresis is provided by coupling output 295 through third resistor R3 to the positive input of operational amplifier 290. The resulting square wave has peaks corresponding to points where ring signal 60 crosses line threshold voltage 55.

Output 295 is coupled to transistor 305 through fourth resistor R4 and to ground 310 through fifth resistor R5. When output 295 is high, transistor 305 conducts current from first $V_{CC}$ 315 through sixth resistor R6 to ground 310, thus creating a low signal at /RING DETECT 320. When output 295 is low, transistor 305 does not conduct current from first $V_{CC}$ 315 to ground 310, thus the potential of first $V_{CC}$ 315 is seen through sixth resistor R6 and /RING DETECT 320 is high.

Where electrical functions and connections are described in this disclosure, it is understood that it is possible, within the scope of this invention, to use equivalent circuits to perform the described functions. As an example, a transistor can be used as a diode or resistor. Likewise, two electrical components which are connected may have interceding components which physically separate the two components. "Connected" is, therefore, intended to include components which are in electrical communication despite intervening components.

Typical values for the electrical components discussed above are listed in Table 2.

TABLE 2

| Device | Typical Value | Device | Typical Value | Device | Typical Value |
|---|---|---|---|---|---|
| R1 | 3.9MΩ | R4 | 4.7 kΩ | C1 | 0.01 μF |
| R2 | 3.9MΩ | R5 | 10 kΩ | C2 | 0.01 μF |
| R3 | 10 kΩ | R6 | 4.7 kΩ | | |

Ring detecting circuit 240 is a preferred means for detecting and profiling a ring signal 60. Alternatively, means for detecting and profiling ring signal 60 may be any means known in the art for detecting and profiling ring signal 60.

Figure 11:
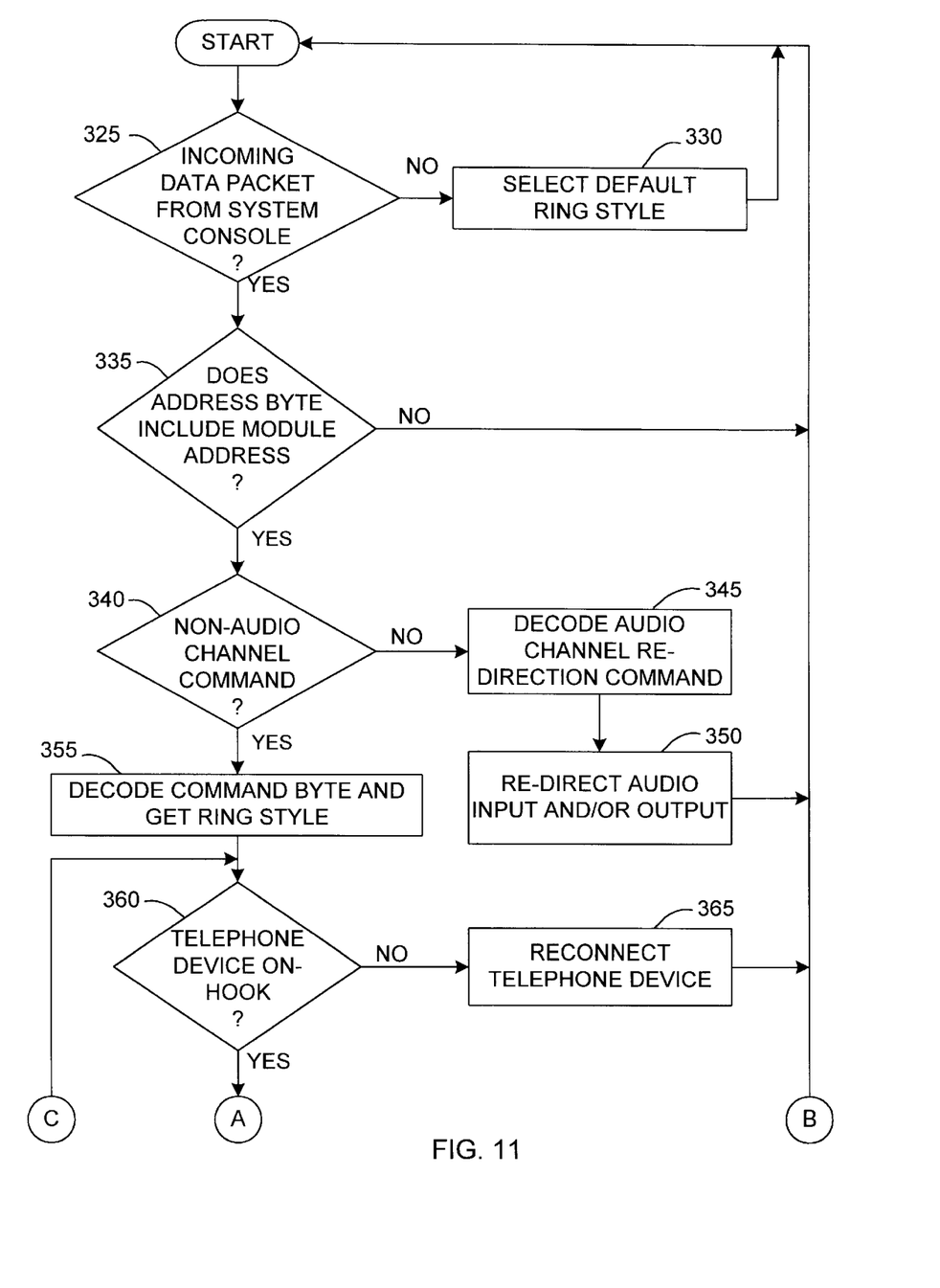
FIGS. 11 and 12 illustrate a flow diagram for each addressable extension module of the present invention.
Figure 12:
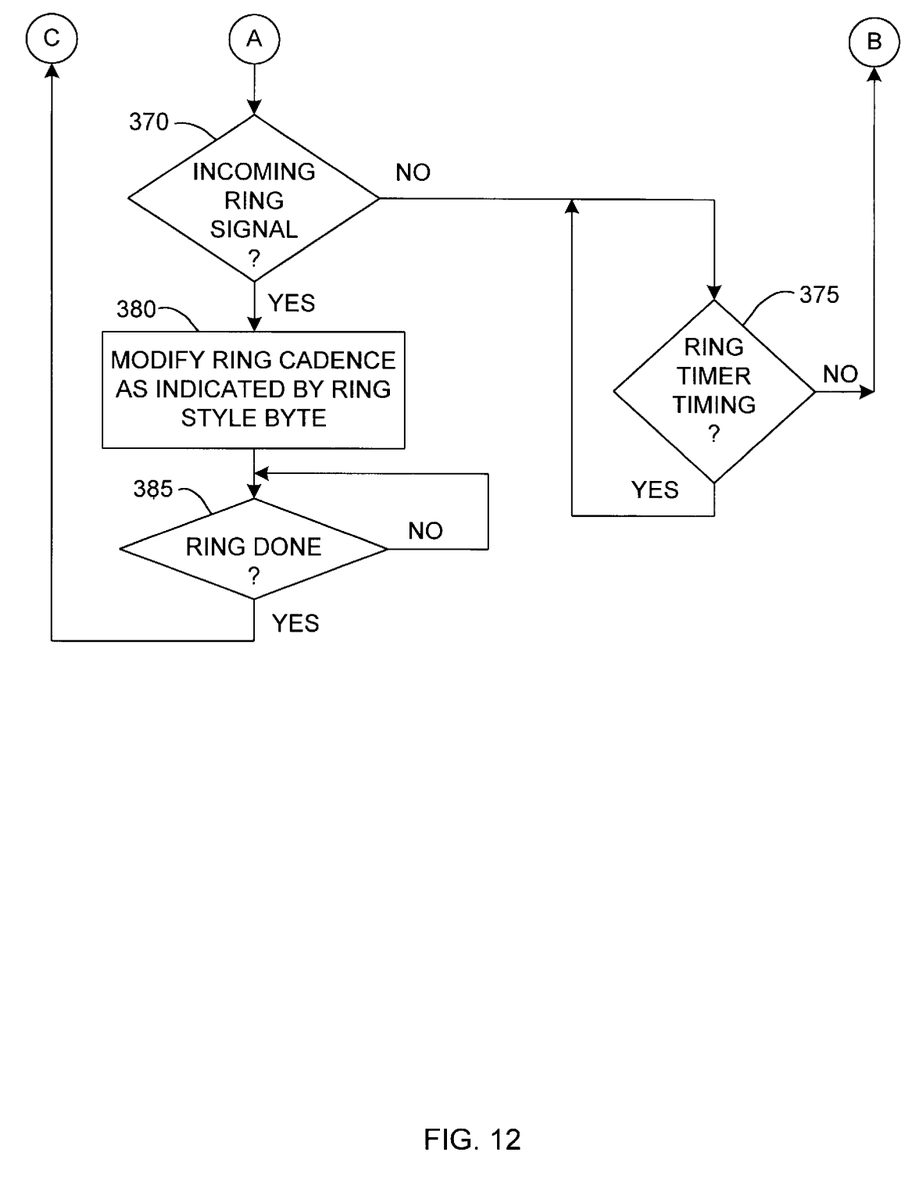

FIGS. 11 and 12 illustrate a flow chart for controlling an addressable extension module 20 of the present invention. Addressable extension module 20 checks 325 for an incoming data packet from system console 10. If no incoming data packet is present, addressable extension module 20 selects 330 the default ring style and again checks 325 for an incoming data packet. If an incoming data packet from system console 10 is present, addressable extension module 20 determines 335 if the address byte of the data packet includes the addressable extension module's address (module address). If the address byte does not include the module address, addressable extension module 20 again checks 325 for an incoming data packet. If the address byte includes the module address, addressable extension module 20 determines 340 if the control byte of the data packet is a non-audio channel command. If the control byte is an audio channel command, addressable extension module 20 decodes 345 the audio channel command and redirects 350 audio input and output accordingly.

Audio input and output are redirected by either 1) providing direct communication between telephone device 25 and telephone line 15 or 2) encoding/decoding the input according to the type of audio signal. An analog signal is encoded/decode using frequency modulation of a carrier signal. A data audio signal is encoded/decoded using an FSK format.

If the control byte is not an audio channel command, then addressable extension module 20 decodes 355 the command byte to determine the ring style. A check 360 is next made to determine if telephone device 25 is "on hook." If telephone device 25 is "off hook," telephone device 25 is connected 365 to telephone line 15. If telephone device 25 is "on hook," then a check 370 is made for an incoming ring signal 50. If no incoming ring signal 50 is detected, a check 375 is made to determine if a ring signal timer is still timing. The ring signal timer is set to the duration of a ring signal 50 and begins timing down at the beginning of each ring. The ring signal timer is preferably implemented in a combination of hardware and software associated with microprocessor. When the ring signal timer has timed out, the process begins again and a check 325 is made for an incoming control byte.

If an incoming ring signal 50 is detected, ring signal 50 is modified 380 as indicated by the ring style byte. If the ring style byte indicates a "normal" ring, then telephone device 25 switch holds telephone device 25 in contact with telephone line 15 throughout the entire ring cadence. If a short ring 65 (FIG. 5) is indicated, then ring detecting circuit 240 and ring pulse counter 220 count the appropriate number of pulses which are defined as the number of negative pulses where excursions exceed the −48 volts (zero crossing), until short ring 65 duration is met. At this point telephone device switch disconnects telephone device 25 from telephone line 15 for the remainder of the ring. If a double short ring 75, 80 (FIG. 6) is indicated, then the previous procedure as described is followed with the exception that telephone device 25 is disconnected from telephone line 15 for a pre-determined portion of the active ring cycle. Disconnection for the correct time and duration creates two short rings 75, 80 within the normal two second ring period. Regardless of the selected ring style, when ring signal 50 has finished 385, addressable extension module 20 then loops back to check 360 if telephone device 25 is "off hook."

While the present invention has been described by reference to specific embodiments, it will be obvious that other alternative embodiments and methods of implementation or modification may be employed without departing from the true spirit and scope of the invention.

What is claimed is:

1. A communication system for altering an incoming ring signal to produce a selected ring signal on a first telephone device, the incoming ring signal accompanied by a caller ID packet and provided by a telephone utility provider in response to a call made by a caller, the communication system comprising:

(a) a system console communicating with the telephone line, said system console including:
  (i) means for decoding the caller ID packet to determine the identity of the caller;
  (ii) a storage device for storing saved caller information, the saved caller information including caller identities and corresponding ring control information;
  (iii) means for selecting ring control information from the saved caller information and the identity of the caller; and (iv) means for providing the ring control information to the telephone line; and,
(b) a first addressable extension module communicating with the first telephone device and the telephone line, the first addressable extension module including:
  (i) means for receiving the ring control information from the telephone line;
  (ii) means for detecting the incoming ring signal;
  (iii) means for measuring a duration of the incoming ring signal; and
  (iv) switching means, responsive to the ring control information, for selectively providing communication during the incoming ring signal between the first telephone device and the telephone line to produce the selected ring signal.

2. The communications system of claim 1 wherein the ring control information includes a unique ring cadence.

3. The communications system of claim 1 wherein
(a) the ring control information includes an address selection;
(b) said addressable module further includes:
  (i) a module address; and
  (ii) means for determining whether the address selection includes the module address; and,
(c) said switching means further includes means for selectively providing communication during the incoming ring signal between the first telephone device and the telephone line if the address selection includes the module address.

4. The communications system of claim 1 wherein the ring control information is provided at a frequency above human audible range and above a frequency passed by the telephone utility provider.

5. The communications system of claim 1 further including means for providing an audio channel command on the telephone line, wherein:
(a) said system console further includes:
  (i) means for receiving the audio channel command from the telephone line;
  (ii) means for determining audio link channel control information from the audio channel commands;
  (iii) means for providing the audio link channel control information to the telephone line;
(b) said first addressable extension module further includes:
  (i) means for receiving the audio link channel control information from the telephone line;
  (ii) means for receiving an audio signal from the first telephone device; and
  (iii) first redirecting means responsive to the audio link channel control information for redirecting the audio signal to the telephone line; and,
(c) at least a second addressable extension module communicating with at least a second telephone device and the telephone line, the at least second addressable extension module including:
  (i) means for receiving the audio link channel control information from the telephone line;
  (ii) second redirecting means responsive to the audio link channel control information for redirecting the audio signal from the telephone line; and
  (iii) means for providing the audio signal to the at least second telephone device.

6. The communications system of claim 5 wherein:
(a) said first redirecting means includes means for providing the audio signal to the telephone line; and,
(b) said second redirecting means includes means for receiving the audio signal from the telephone line.

7. The communications system of claim 5 wherein:
(a) the audio signal is a analog signal;
(b) said first redirecting means includes:
  (i) means for modulating a carrier signal with the analog signal to create a modulated signal having frequencies above human audible range and above a frequency passed by the telephone utility provider; and
  (ii) means for providing the modulated signal to the telephone line; and,
(c) said second redirecting means includes:
  (i) means for receiving the modulated signal from the telephone line; and
  (ii) means for demodulating the modulated signal to the analog signal.

8. The communications system of claim 5 wherein:
(a) the audio signal is a data signal;
(b) said first redirecting means includes:
  (i) means for encoding the data signal to a frequency shift keying encoded signal having mark and space frequencies above human audible range and above a frequency passed by the telephone utility provider; and
  (ii) means for providing the encoded signal to the telephone line; and,
(c) said second redirecting means includes:
  (i) means for receiving the encoded signal from the telephone line; and
  (ii) means for decoding the encoded signal to the data signal.

9. A communication system for providing communication over a telephone line between a first telephone device and at least a second telephone device, the communication system comprising:
(a) means for providing an audio channel command on the telephone line;
(b) a system console communicating with the telephone line, said system console including:
  (i) means for receiving the audio channel command from the telephone line;
  (ii) means for determining audio link channel control information from the audio channel commands;
  (iii) means for providing the audio link channel control information to the telephone line;
(c) a first addressable extension module communicating between the first telephone device and the telephone line, the first addressable extension module including:
  (i) means for receiving the audio link channel control information from the telephone line;
  (ii) means for receiving an audio signal from the first telephone device; and
  (iii) first redirecting means responsive to the audio link channel control information for redirecting the audio signal to the telephone line; and,
(d) at least a second addressable extension module communicating with at least a second telephone device and the telephone line, the at least second addressable extension module including:
  (i) means for receiving the audio link channel control information from the telephone line;
  (ii) second redirecting means responsive to the audio link channel control information for redirecting the audio signal from the telephone line; and (iii) means for providing the audio signal to the at least second telephone device.

10. The communications system of claim 9 wherein:
(a) said first redirecting means includes means for providing the audio signal to the telephone line; and,
(b) said second redirecting means includes means for receiving the audio signal from the telephone line.

11. The communications system of claim 9 wherein:
(a) the audio signal is a analog signal;
(b) said first redirecting means includes:
   (i) means for modulating a carrier signal with the analog signal to create a modulated signal having frequencies above human audible range and above a frequency passed by the telephone utility provider; and
   (ii) means for providing the modulated signal to the telephone line; and,
(c) said second redirecting means includes:
   (i) means for receiving the modulated signal from the telephone line; and
   (ii) means for demodulating the modulated signal to the analog signal.

12. The communications system of claim 9 wherein:
(a) the audio signal is a data signal;
(b) said first redirecting means includes:
   (i) means for encoding the data signal to a frequency shift keying encoded signal having mark and space frequencies above human audible range and above a frequency passed by the telephone utility provider; and
   (ii) means for providing the encoded signal to the telephone line; and,
(c) said second redirecting means includes:
   (i) means for receiving the encoded signal from the telephone line; and
   (ii) means for decoding the encoded signal to the data signal.

13. A method for altering an incoming ring signal to produce a selected ring signal on a first telephone device, the incoming ring signal accompanied by a caller ID packet and provided by a telephone utility provider in response to a call made by a caller, the method comprising:
(a) providing a system console communicating with the telephone line;
(b) providing a first addressable extension module communicating with the first telephone device and the telephone line;
(c) the first addressable extension module detecting the incoming ring signal;
(d) the first addressable extension module measuring a duration of the incoming ring signal;
(e) the system console decoding a caller ID packet to determine the identity of the caller;
(f) the system console selecting ring control information from the identity of the caller and saved caller information;
(g) the system console providing the ring control information to the telephone line;
(h) the first addressable extension module receiving the ring control information from the telephone line; and,
(i) the first addressable extension module, responsive to the ring control information, selectively providing communication during the incoming ring signal between the first telephone device and the telephone line to produce the selected ring signal.

14. The method of claim 13 wherein the ring control information includes a unique ring cadence.

15. The method of claim 13 wherein the ring control information includes an address selection and further including:
(a) the first addressable extension module determining whether the address selection includes the module address; and,
(b) the first addressable extension module selectively providing communication during the incoming ring signal between the first telephone device and the telephone line while the address selection matches the module address.

16. The method of claim 13 wherein the ring control information is provided at a frequency above human audible range and above a frequency passed by the telephone utility provider.

17. The method of claim 13 further including:
(a) providing at least a second addressable extension module communicating with at least a second telephone device and the telephone line;
(b) providing an audio channel command on the telephone line;
(c) the system console receiving the audio channel command from the telephone line;
(d) the system console determining audio link channel control information from the audio channel commands;
(e) the system console providing the audio link channel control information to the telephone line;
(f) the first and the at least second addressable extension modules receiving the audio link channel control information from the telephone line;
(g) the first addressable extension module receiving an audio signal from the telephone device;
(h) responsive to the audio link channel control information, redirecting the audio signal from the first addressable extension module to the at least second addressable extension module; and,
(i) the at least second addressable extension module providing the audio signal to the at least second telephone device.

18. The method of claim 17 wherein redirecting the audio signal includes:
(a) the first addressable extension module providing the audio signal to the telephone line; and,
(b) the at least second addressable extension module receiving the audio signal from the telephone line.

19. The method of claim 17 wherein the audio signal is a analog signal and redirecting the audio signal includes:
(a) the first addressable extension module modulating a carrier signal with the analog signal to create a modulated signal having frequencies above human audible range and above a frequency passed by the telephone utility provider;
(b) the first addressable extension module providing the modulated signal to the telephone line;
(c) the at least second addressable extension module receiving the modulated signal from the telephone line; and,
(d) the at least second addressable extension module demodulating the modulated signal to the analog signal.

20. The method of claim 17 wherein the audio signal is a data signal and redirecting the audio signal includes:

(a) the first addressable extension module encoding the data signal to a frequency shift keying encoded signal having mark and space frequencies above human audible range and above a frequency passed by the telephone utility provider;

(b) the first addressable extension module providing the encoded signal to the telephone line (c) the at least second addressable extension module receiving the encoded signal from the telephone line; and, (d) the at least second addressable extension module decoding the encoded signal to the data signal.

21. A method for providing communication over a telephone line between a first telephone device and at least a second telephone device, the method comprising:

(a) providing an audio channel command on the telephone line;

(b) providing a system console communicating with the telephone line;

(c) the system console receiving the audio channel command from the telephone line;

(d) the system console determining audio link channel control information from the audio channel commands;

(e) the system console providing the audio link channel control information to the telephone line;

(f) providing a first addressable extension module communicating between the first telephone device and the telephone line;

(g) providing at least a second addressable extension module communicating with at least a second telephone device and the telephone line;

(h) the first and the at least second addressable extension modules receiving the audio link channel control information from the telephone line;

(i) the first addressable extension module receiving an audio signal from the telephone device;

(g) responsive to the audio link channel control information, redirecting the audio signal from the first addressable extension module to the at least second addressable extension module; and, (k) the at least second addressable extension module providing the audio signal to the at least second telephone device.

22. The method of claim 21 wherein redirecting the audio signal includes:

(a) the first addressable extension module providing the audio signal to the telephone line; and, (b) the at least second addressable extension module receiving the audio signal from the telephone line.

23. The method of claim 21 wherein the audio signal is a analog signal and redirecting the audio signal includes:

(a) the first addressable extension module modulating a carrier signal with the analog signal to create a modulated signal having frequencies above human audible range and above a frequency passed by the telephone utility provider;

(b) the first addressable extension module providing the modulated signal to the telephone line;

(c) the at least second addressable extension module receiving the modulated signal from the telephone line; and, (d) the at least second addressable extension module demodulating the modulated signal to the analog signal.

24. The method of claim 21 wherein the audio signal is a data signal and redirecting the audio signal includes:

(a) the first addressable extension module encoding the data signal to a frequency shift keying encoded signal having mark and space frequencies above human audible range and above a frequency passed by the telephone utility provider;

(b) the first addressable extension module providing the encoded signal to the telephone line (c) the at least second addressable extension module receiving the encoded signal from the telephone line; and, (d) the at least second addressable extension module decoding the encoded signal to the data signal.

\* \* \* \* \*